United States Patent
Sexton et al.

(10) Patent No.: US 6,499,095 B1
(45) Date of Patent: Dec. 24, 2002

(54) MACHINE-INDEPENDENT MEMORY MANAGEMENT SYSTEM WITHIN A RUN-TIME ENVIRONMENT

(75) Inventors: Harlan Sexton, Menlo Park, CA (US); David Unietis, Menlo Park, CA (US); Mark Jungerman, San Francisco, CA (US); Scott Meyer, Pacifica, CA (US); David Rosenberg, San Jose, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/248,291

(22) Filed: Feb. 11, 1999

(51) Int. Cl.[7] .............................................. G06F 12/00
(52) U.S. Cl. ...................................... 711/203; 711/202
(58) Field of Search ................................ 711/203, 202, 711/200; 707/103, 203, 206, 202

(56) References Cited

U.S. PATENT DOCUMENTS

| | | | | |
|---|---|---|---|---|
| 5,426,747 A | | 6/1995 | Weinreb et al. ............. | 395/400 |
| 5,794,256 A | * | 8/1998 | Bennett ........................ | 707/206 |
| 5,805,896 A | * | 9/1998 | Burgess ....................... | 395/710 |
| 5,845,331 A | | 12/1998 | Carter et al. | |
| 6,009,266 A | * | 12/1999 | Brownell ...................... | 395/863 |
| 6,105,041 A | * | 8/2000 | Bennett ........................ | 707/206 |
| 6,128,621 A | * | 10/2000 | Weisz .......................... | 707/103 |
| 6,154,823 A | | 11/2000 | Benayon et al. | |
| 6,178,519 B1 | * | 1/2001 | Tucker .......................... | 714/4 |
| 6,199,141 B1 | * | 3/2001 | Weinreb ....................... | 711/118 |
| 6,298,401 B1 | * | 10/2001 | Anderson .................... | 710/74 |

FOREIGN PATENT DOCUMENTS

| | | |
|---|---|---|
| EP | 0 700 000 A2 | 3/1996 |
| EP | 0 874 309 A2 | 10/1998 |
| EP | 0967546 A2 * | 12/1999 ............. G06F/9/44 |
| GB | 2 239 335 A | 9/1990 |

OTHER PUBLICATIONS

Millard et al. "Run–Time Support and Storage Management for Memory–Mapped Persistent Objects", Dec. 1993; IEEE.*
Pointer Swizzling at Page Fault Time: Efficiently Supporting Huge Address Spaces on Standard Hardware—Jun. 1991 No. 4—pp. 6–13.
Working with Persistant Objects: to Swizzle or Not to Swizzle—pp. 657–673.
XP–002141155—Generational Garbage Collection pp. 146–163.
XP–002141152—Introduction pp. 1–38.
XP–002141153—A Real–Time Garbage Collector Based on the Lifetimes of Objects—vol. 26 No. 6.
XP–002141154—Oracle8i Java Developer's Guide—pp. 1–17.

* cited by examiner

Primary Examiner—Do Hyun Yoo
Assistant Examiner—Kimberly McLean-Mayo
(74) Attorney, Agent, or Firm—Ditthavong & Carlson, P.C.

(57) ABSTRACT

An invariant numeric reference format is defined in a run-time environment for both run-time and storage use. A numeric reference to an object encodes the location of the object as an integral offset from an implicit machine pointer. In environments where the size of contiguous virtual memory segments is limited, objects are stored in a number of fixed-size contiguous chunks in virtual memory called pages. A page-offset numeric reference includes an offset and a page number, which is used to index a page map that contains a page pointer to the beginning of the page. Page-offset numeric references are dereferenced by adding the offset in the numeric reference to the page pointer obtained from the page map based on the page number in the numeric reference.

30 Claims, 5 Drawing Sheets

MACHINE-INDEPENDENT MEMORY MANAGEMENT SYSTEM WITHIN A RUN-TIME ENVIRONMENT

RELATED APPLICATIONS

The present application is related to the following applications:

U.S. patent application Ser. No. 09/248,295, entitled "A Memory Management System Within a Run-Time Environment," filed on even date herewith by Harlan Sexton et al., the contents of which are hereby incorporated by reference.

U.S. patent application Ser. No.09/248,294, entitled "Address Calculation of Invariant References Within a Run-Time Environment," filed on even date herewith by Harlan Sexton et al., the contents of which are hereby incorporated by reference.

U.S. patent application Ser. No. 09/248,297, entitled "A Paged Memory Management System Within a Run-Time Environment," filed on even date herewith by Harlan Sexton et al., the contents of which are hereby incorporated by reference.

FIELD OF THE INVENTION

The present invention relates to computer systems and more particularly to managing memory for a run-time environment.

BACKGROUND OF THE INVENTION

A dynamic run-time environment for a language such as JAVA™ is responsible for managing memory for objects that are created and destroyed during the execution of a program. An object may be defined as a logically contiguous atomic unit of typed state of the program. Objects thus encapsulate data in particular regions of memory that are allocated and deallocated for the program by the dynamic run-time environment.

The state of the program, or "program state," is the set of objects, the content of the objects, and the references between the objects that exist at a specific point in time during the execution of the program. A "reference" to an object is an entity used to identify and ultimately access a region of memory that stores the data of the object. Typically, references between objects in a run-time environment are encoded using machine pointers. A machine pointer is a native entity that contains the address of the object in the main memory, which can be a real address or, more commonly, a virtual address. Since machine pointers are closely coupled to the underlying hardware and firmware of a computer system, machine pointers provide a fast means of accessing objects and, hence, are a popular implementation for references.

In a run-time environment, however, a program state that contains machine pointers is so machine-dependent that it is sometimes disadvantageous. For example, it may be desirable to store the program state on disk or other secondary storage medium and restore the stored program state to main memory. Some run-time environments, in fact, are designed to use the same program state on different types of machines. For instance, such run-time environments provide load-balancing and crash recovery functions by transferring the execution of a program (including its state) from one machine to another.

One of the reasons why machine pointers are not machine-independent is that the size in bits of a machine pointer is determined by the extent of the virtual address space, which varies between computer architectures. In fact, some computer architectures even have pointers of varying sizes, for example, near (16-bit) pointers and far (32-bit) pointers. If program state includes machine pointers whose size varies from platform to platform, then the size of objects will vary from platform to platform. Furthermore, since the size of intervening objects will vary, the relative locations between objects will vary from platform to platform. For example, on a platform with near pointer the relative location of one object can be 48 bytes from another object, but on a platform with far pointers, the relative location might increase to 96 bytes.

One approach directed to machine independence, known as "pointer swizzling," employs two completely different formats for representing references: a machine-dependent runtime format using pointers for references in main memory, and a platform invariant format for encoding references in secondary storage. When the reference is written to secondary storage, machine pointers are converted into a machine-independent symbol such as a string or serial number. When the reference is read back into main memory from secondary storage, the symbol is unswizzled and converted back into a machine pointer. Swizzling is also referred to as "serialization" and "pickling." Since the size and relative locations of objects differs between platforms, swizzling and unswizzling operations employ a look-up technique into an associative data structure, wherein a machine pointer is associated with a corresponding symbol. Look-up operations, however, are computationally expensive, requiring many memory accesses into an auxiliary symbol table, typically implemented by a hash table or binary tree stored in memory. Thus, frequent storage and retrieval of program state into and out of secondary storage can be responsible for a significant drain on system performance.

Differences between server environments make machine independence very difficult to achieve for portable run-time environments even with pointer swizzling. For example, some operating systems, in practice if not by design, limit the guaranteed size of contiguous virtual memory to a "page," typically about two or four kilobytes in size. This page-size limitation is particularly common for allocating objects in shared memory for access by different processes. Consequently, in paged memory systems, large objects such as arrays cannot be contiguously allocated for these servers. Prior paged memory systems either failed when sufficiently large blocks of virtual memory were not available, or employed ad hoc constructions to simulate specific array types.

Failure to allocate memory for large objects, merely because sufficient contiguous virtual address space is unavailable, limits the availability and marketability for such run-time environments. Ad hoc simulations, moreover, are impracticable for paged memory servers especially for large, user defined objects, because they are unknown to the designer of the run-time environment. Furthermore, it is difficult to integrate such ad hoc solutions with the pointer swizzling operations for addressing machine independence.

SUMMARY OF THE INVENTION

There exists a need for a memory management system that can efficiently save and restore program state in a machine-independent format. Specifically, a need exists for a reference format that can be easily stored and has comparatively efficient run-time performance. There is also a need for a memory management system that is portable to, and capable of working with, operating systems that impose a page-size limitation to contiguous memory.

These and other needs are addressed by the present invention, in which a genus of machine-independent formats, called a numeric reference format, is defined for both run-time and storage. A numeric reference to an object encodes the location of the object as an integral offset from an implicit machine pointer. Since the semantics of an integer, as opposed to a native machine pointer, can be completely specified in terms of size and byte-order, integers can be easily translated between machines without applying computationally expensive pointer swizzling operations.

Accordingly, one aspect of the invention relates to a computer-implemented method and a computer-readable medium bearing instructions for managing memory for a run-time environment. The methodology includes storing a plurality of objects in a virtual memory; storing references between the objects as numeric references in the virtual memory; and storing the objects in a secondary storage that is not part of the virtual memory and the references in a numeric reference format in a secondary storage that is not part of the virtual memory.

Another aspect of the invention involves a computer-implemented method and a computer-readable medium bearing instructions for managing memory for a run-time environment. Management of the run-time environment involves loading objects into virtual memory from secondary storage that is not part of the virtual memory; loading references between the objects as numeric references into the virtual memory; and dereferencing one of the numeric references by adding, to a machine pointer, an offset contained within the numeric reference. Use of numeric references for storing references between objects provides an invariant representation for references, thereby enabling machine-independent program state to be stored within and loaded from secondary storage that is not part of the virtual memory.

In circumstances where program state containing the objects and references is to be used in environments where the size of contiguous virtual memory segments is limited, the objects are stored or loaded into virtual memory in a number of fixed-size contiguous chunks called "pages." A "page-offset" numeric reference for such environments includes a page number, which is used to index a page map that contains a page pointer to the beginning of the page, and an offset. Page-offset numeric references are dereferenced by adding the offset in the numeric reference to the page pointer obtained from the page map based on the page number in the numeric reference. Use of page-offset numeric references allows for a software virtual memory system to be systematically implemented for all system-defined and user-defined types supported in a run-time environment, in effect, implementing a software paged memory system.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for memory management in a run-time environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
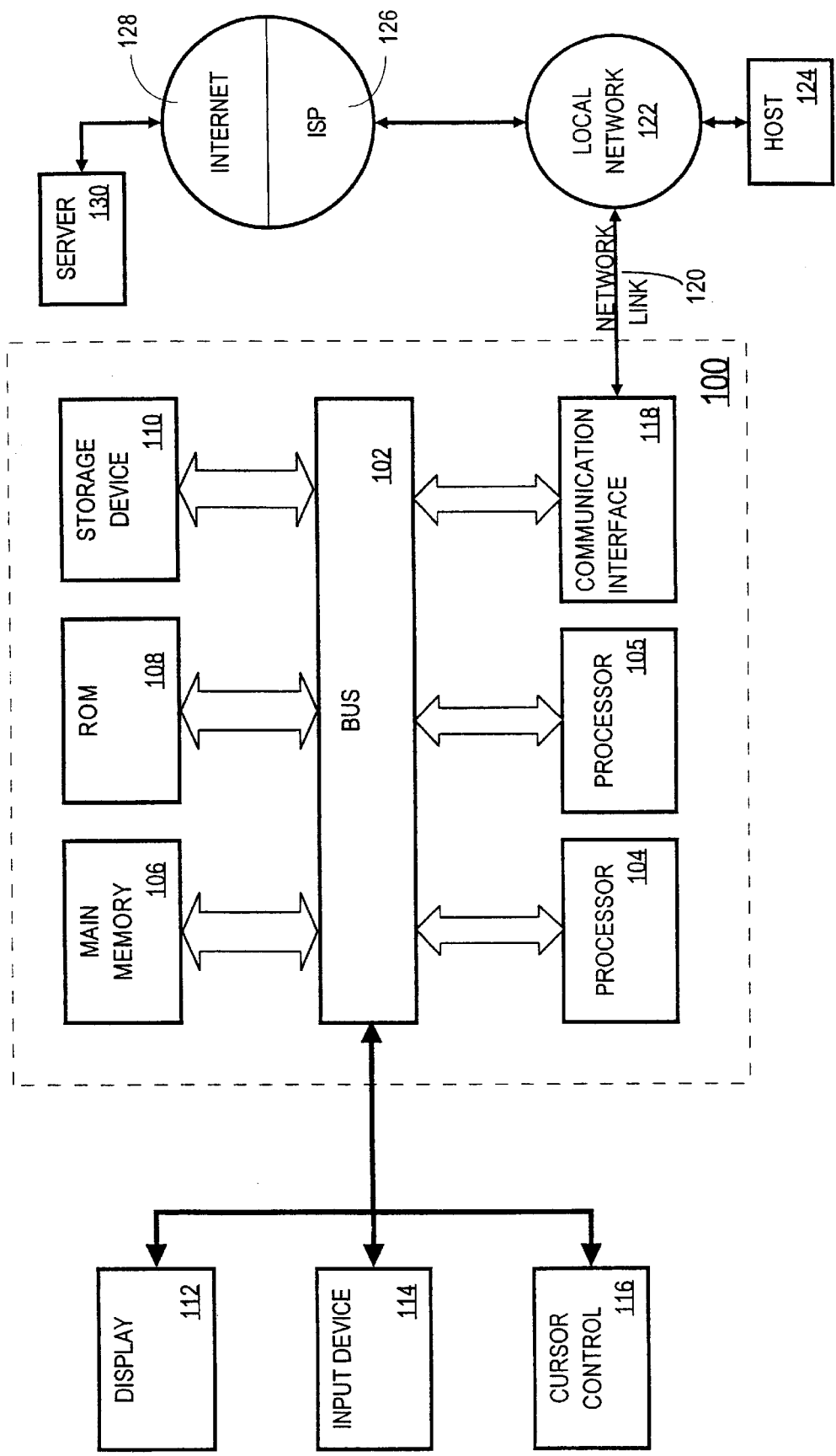
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 1 10 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, typically takes the form of a random access storage device such as a magnetic or optical disk. Networked secondary storage is provided by storage devices on other computer systems, for example on host 124, accessible over a local area network 122, or server 130, accessible over a wide area network such as the Internet.

Numeric References

A numeric reference employs a machine-independent format for encoding references between objects that is suitable for both run-time use in virtual memory and storage use in secondary storage. Unlike symbols and strings employed with pointer swizzling, numeric references are easily stored in a secondary storage, in some cases needing no conversion at all and in other cases requiring only minor arithmetic-logical operations such as bit-twiddling and byte rearrangement. For run-time usage, numeric references can be efficiently "dereferenced," that is, converted into a machine pointer, without requiring many memory accesses into an auxiliary symbol table, hash table, tree, or other complex data structure. Therefore, numeric references need not be converted into machines at load time, reducing the overhead of loading program state.

Preferably, numeric references are implemented in a run-time environment that requires all encoded data (e.g. for objects) to be strongly typed and all primitive types, including references, to have an invariant format. For example, a run-time environment may require floating point numbers to use an IEEE format. In such a run-time environment, references between objects, conventionally implemented by machine pointers, are encoded as integer values indicating offsets from an implicit machine pointer. The numeric reference is defined to be invariant having a specified number of bytes, a specified byte-ordering, and a specified alignment. The implicit machine pointer is a virtual address that is derivable from the memory environment of one the objects.

For example, numeric references may be encoded as a little endian, two's complement (if signed) four-byte integer referring to objects aligned on an eight-byte boundary, although numeric references in accordance with the present invention, of course, are not limited to these particular specifications. Since almost all machines provide a mapping between a numeric type and a native primitive type, accessing data in this format is at least as efficient as, for example, accessing structures generated by C compilers for that machine.

The use of numbers to encode references stems from the realization that the invariant format for encoding objects and primitive types in a run-time environment ensures that every instance of a type will have the same size between platforms. Since every object has a consistent size between platforms, the relative locations between objects are also consistent. Since objects on any platform will be located at a consistent offset from some point in the virtual address space, this offset can be expressed as a consistent number of bytes from a virtual address. Thus, numeric references include an offset portion that indicates a number of bytes from an implicit address. Consequently, numeric references are machine-independent, and program state with numeric references can be used on incompatible processors, such as processors with differently sized machine pointers.

Since a process may use some of its virtual address space for storing non-invariant data, i.e. for purposes other than storing program state, it is useful to define a physical or logical area of the virtual address space in which the offsets between objects remain consistent and thus can be advantageously expressed as numbers. An "object memory" is a subset of the virtual address space containing either existing objects or available space for allocating new objects. Since an object memory is a subset of the virtual address space, numeric references within the object memory can be smaller than machine pointers. For example, 32-bit (four-byte) numeric references can be profitably used on a computer with a 64-bit virtual address space ($2^{64}$, about 16 billion gigabytes). Since one of the impediments to machine-independence is the differing sizes of machine pointers, the use of fixed-size numeric references, even in very large virtual address spaces, helps in attaining a machine-independent reference format.

In some implementations, a plurality of object memories is provided, for example, to hold objects of different durations, or of other distinct characteristics, to assist in garbage collection. Accordingly, numeric references encode references between objects in the same object memory. References between objects of different object memory, on the other hand, would be encoded in another reference format having the same size as the numeric reference. For example, indexed references, which are described infra, are one type of format that may be used for such inter-object memory references.

In contrast to symbols swizzled from machine pointers, numeric references are easily converted into and from machine pointers. In general, a numeric reference to an object is converted into a machine pointer to the object by adding an offset contained in the numeric reference to an implicit virtual address. Conversely, a machine pointer to the object is converted into a numeric reference by calculating a pointer difference between the machine pointer to the object and the implicit virtual address. The implicit virtual address points to the beginning of a region of the virtual memory space in which the referencing object or the referenced object is located. The precise identity of the implicit virtual address depends more specifically on the species of the numeric reference that is employed.

Three numeric references are disclosed herein: (1) a base-offset numeric reference, which contains an offset relative to a "base address" at the beginning of the object memory, especially if the object memory consists of a contiguous segment of memory, (2) a page-offset numeric reference that is relative to the start of a page also specified in the numeric reference, and (3) a self-relative numeric reference, that is relative to the beginning of the referencing object.

Base-Offset Numeric References

Figure 2A:
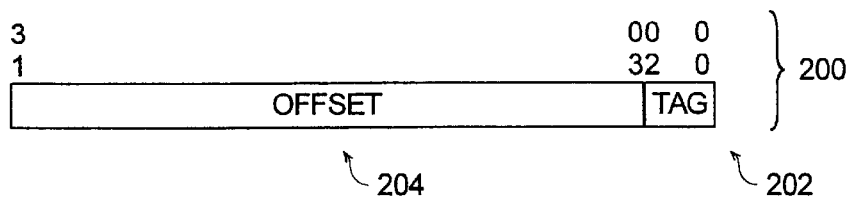
FIG. 2(a) is schematic drawing of a layout of a base-offset numeric reference.

A base-offset numeric reference to an object encodes the location of the object as an offset from the beginning of the object memory within which the object is located. FIG. 2(a) depicts a layout of an exemplary four-byte (32-bit) base-offset numeric reference 200. In some embodiments, the base-offset numeric reference 200 includes, in addition to the offset, a small number of bits for a tag 202, that is used for discriminating among various kinds of numeric and other supported reference formats and to cache storage properties of the referenced object. The function of the tag 202 is described in more detail hereafter. It is to be understood that the present invention is not limited to numeric references that include a tag 202.

The base-offset numeric reference 200 includes an offset 204, which indicates the displacement from a base address. If the base-offset numeric reference includes a tag 202, the offset 204 may be defined as the numeric reference with the tag 202 masked off. For example, a base-offset numeric reference having a hexadecimal value of 0x00046740 specifies a displacement of 0x00046740 or 288,576 bytes from the base address. As another example, a three-bit tagged numeric reference of 0x00004321 specifies a displacement of 0x00004320 or 17,184 bytes from the base address.

Figure 2B:
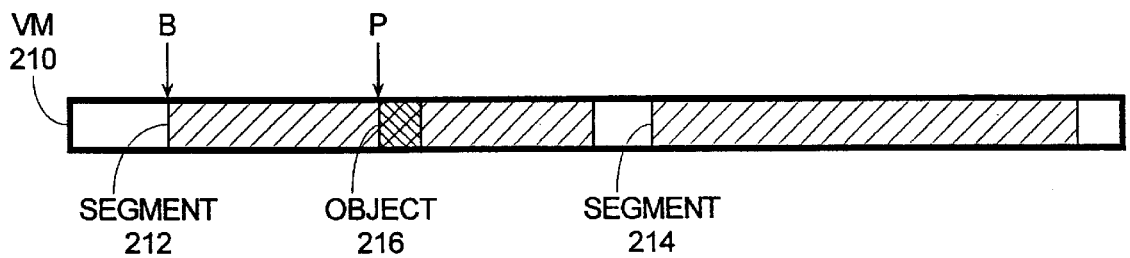
FIG. 2(b) is a schematic drawing of a portion of a virtual memory configuration in which the base-offset numeric reference is used.

Referencing and dereferencing a base-offset numeric reference is illustrated with respect to an exemplary memory configuration of a portions of a virtual address space 210 as shown in FIG. 2(b). Virtual address space 210 includes an object memory consisting of a contiguous memory segment 212 and another object memory consisting of a contiguous memory segment 214. The contiguous memory segment size is preferably large, for example, in the range of 256 kB (218 bytes) to 32 MB (225 bytes), such as 4 MB ($2^{22}$ bytes). The beginning of contiguous memory segment 212 is located at a base address marked by base pointer B. Object 216 is located at an address marked by object machine pointer P within contiguous memory segment 212.

For purposes of discussion, it will be assumed that the object machine pointer is not tagged or if the object machine pointer P is tagged, the tag is masked off from the object machine pointer P as the beginning of the calculations. In those embodiments that employ tagged numeric references, it is assumed that the appropriate tag 202 will be handled separately in the numeric reference 200.

Figure 2C:
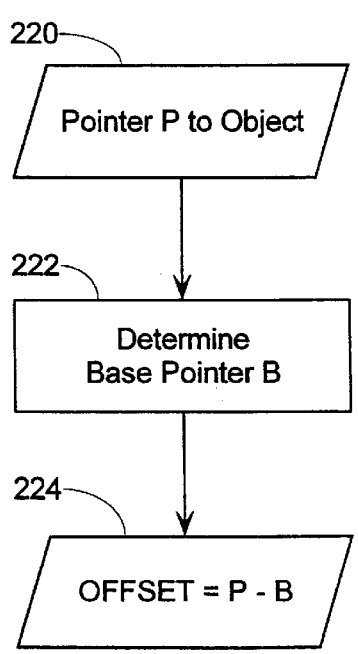
FIG. 2(c) is a flowchart for generating a base-offset numeric reference from a machine pointer.

FIG. 2(c) illustrates steps taken to produce a base-offset numeric reference based on a machine pointer P to object 216. At step 220, the machine pointer P to object 216 is obtained, typically from a variable passed into a function, returned from a function or memory allocation operator, loaded from a memory address not part of the program state, or produced by dereferencing a numeric reference. In a working example to illustrate this calculation, a machine pointer P having a value of 0x20446740 is obtained from a pointer parameter passed into a function of the run-time environment.

At step 222, a base pointer B containing the base address of the object memory is determined. If the contiguous memory segment is guaranteed to be aligned on a boundary at least as large as the size of the contiguous memory segment, then the base address can be determined by masking off the appropriate number of bits from the machine pointer P. In this case, if contiguous memory segment is aligned on a 4 MB boundary, then the base pointer can be obtained by masking off the least significant 22 bits to produce, for example, a base address of 0x2040000.

On the other hand, for implementations without this guarantee, then a header or pre-header for the object may be consulted by dereferencing the machine pointer P plus a fixed non-negative or negative displacement, respectively. In various implementations, the header or pre-header may contain the base address itself or an object memory identifier that can used to index a data structure to retrieve the base address. In the working example, let us assume that a base pointer having a base address of 0x20400000 is determined.

At step 224, the offset 204 that will be stored in the base-offset numeric reference 200 is calculated as a difference of the virtual address of the object 216 and the base address of the object memory consisting of the contiguous memory segment 212. This calculation can be performed by subtracting the base pointer B from the object pointer P. For the implementations that impose a sufficient alignment restriction on contiguous memory segments, then steps 222 and 224 can be coalesced into a single masking of all but the least 22 significant bits, e.g. OFFSET=P&~(~0<<22). In the working example, the calculated offset is 0x20446740−0x20400000=0x00046740, which constitutes the base-offset numeric reference. An appropriate tag 202, if implemented, is added or logically-ored into the result.

Figure 2D:
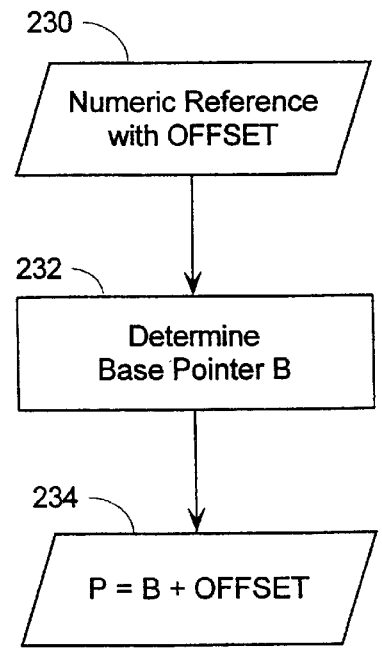
FIG. 2(d) is a flowchart for dereferencing a base-offset numeric reference.

FIG. 2(d) illustrates steps taken to produce a machine pointer P based on a base-offset numeric reference to object 216. At step 230, the base-offset numeric reference to object 216 is obtained, typically by reading from a memory address of the program state. In a working example to illustrate this calculation, a base-offset numeric reference having a value of 0x00046740 is obtained from reading a program state memory location under control of a memory management component of the run-time environment.

At step 232, a base pointer B containing the base address of the object memory is determined. If the contiguous memory segment is guaranteed to be aligned on a boundary at least as large as the size of the contiguous memory segment, then the base address can be determined by masking the appropriate number of bits of the virtual address of the object that contains the numeric reference, or the "referencing object." In this case, if the contiguous memory segment is aligned on a 4 MB boundary, then the base pointer can be obtained by masking off the least significant 22 bits to produce, for example, a base address of 0x2040000.

On the other hand, for implementations without this guarantee, a header or pre-header for the referencing object may be consulted by dereferencing the machine pointer P plus a fixed offset. In various implementations, the header or pre-header may contain the base address itself or an object memory identifier that can used to index a data structure to retrieve the base address. In the working example, let us assume that a base pointer having a base address of 0x20400000 is determined.

At step 234, the virtual address of the object 216 is obtained by adding the offset 204 stored in the numeric reference 200 to the base address of the object memory consisting of the contiguous memory segment 212. This calculation can be performed by adding the offset 204 to the base pointer B. An appropriate machine pointer tag 202, if necessary, is added or logically-ored into the result. In the working example, the virtual address of the object 214 is calculated to be 0x20400000+0x00046740=0x20446740.

Page-Offset Numeric References

In circumstances where the program state is to be used in server environments in which the maximum size of a contiguous memory segment is severely constrained, it is useful to divide the program state into a plurality of fixed-size contiguous chunks of memory called "pages." A page is a moderately sized contiguous memory segment that is supported within the server environments, especially for shared memory. The pages of an object memory need not be contiguous; in other words, a paged object memory contains a plurality of contiguous memory segments in multiples of the page size.

To access the disparate pages of an object memory, a page map is maintained for a paged object memory to keep track of the pages. Each page is assigned a page number, which is used to index the page map to fetch the virtual address of the beginning of the page, called a page address. The indirection provided by the page map indexed by a page number allows pages to be relocated simply by updating the page address in the page map. A certain amount of space, called a "page header" is reserved at the beginning of the page to store useful information for the memory management of the page, including the page number, the address of the page map, and the base address of the object memory (page address for page 0).

Figure 3A:
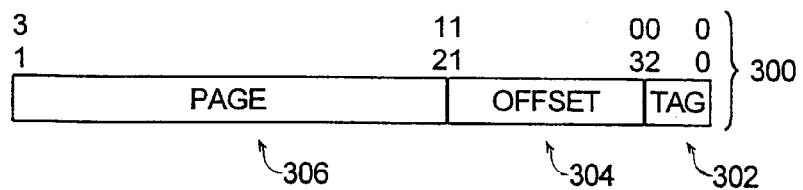
FIG. 3(a) is schematic drawing of a layout of a page-offset numeric reference.

Accordingly, a page-offset numeric reference to an object encodes the location of the object as an offset from the beginning of the page within which the object is located. FIG. 3(a) depicts a layout of an exemplary four-byte (32-bit) page-offset numeric reference 300. In some embodiments, the page-offset numeric reference 300 includes, in addition to the offset, a small number of bits for a tag 302, that is used for discriminating among various kinds of numeric and other supported reference formats and to cache storage properties of the referenced object. The function of the tag 302 is described in more detail infra, and it is to be understood, of course, that the present invention is not limited to numeric references that include a tag 302.

The page-offset numeric reference 300 includes an offset 304, which indicates the displacement from a page address. The page address is determined by accessing a page map for the object memory based on a page number 304 also contained in the page-offset numeric reference. If the page-offset numeric reference includes a tag 302 and a page number 306, the offset 304 may be defined as the numeric reference with the tag 302 and the page number 306 masked off. For example, a page-offset numeric reference having a hexadecimal value of 0x00001740 specifies a displacement of 0x00000740 or 1,856 bytes from the page address of page number 1.

Figure 3B:
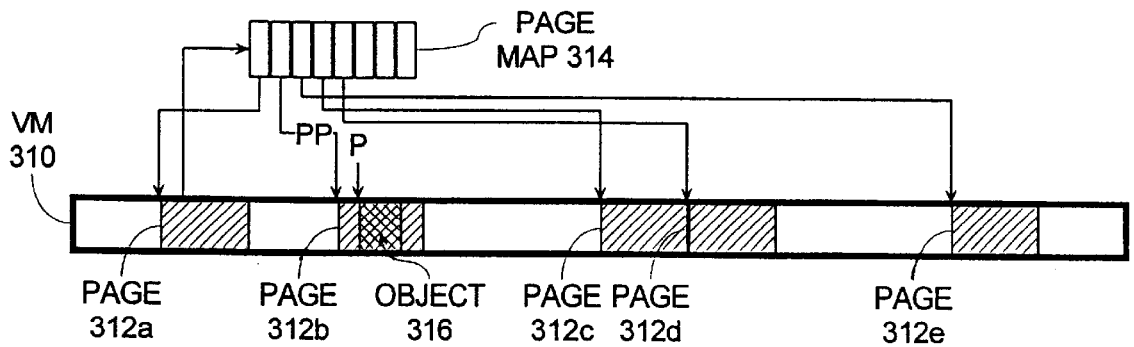
FIG. 3(b) is a schematic drawing of a portion of a virtual memory configuration in which the page-offset numeric reference is used.

Referencing and dereferencing a page-offset numeric reference is illustrated with respect to an exemplary memory configuration of a portions of a virtual address space 310 as shown in FIG. 3(b). Virtual address space 310 includes an object memory comprising pages 312a, 312b, 312c, 312d, and 312e. A page map 314, which in one embodiment is stored in page 0 (312a), contains entries for page addresses corresponding to the pages 312a, 312b, 312c, 312d, and 312e. The page size is preferably moderately sized and compatible with those servers which severely restrict the size of contiguous memory segments. For example, the page size may be in the range of 256B ($2^8$ bytes) to 32 kB ($2^{15}$ bytes), such as 4 kB ($2^{12}$ bytes). The beginning of page 312b is located at a page address marked by page pointer PP. Object 316 is located at an address marked by object machine pointer P within page 312b.

For purposes of discussion, it will be assumed that the object machine pointer is not tagged or if the object machine pointer P is tagged, the tag is masked off from the object machine pointer P as the beginning of the calculations. In those embodiments that employ tagged numeric references, then it is assumed that the appropriate tag 302 will be handled separately in the numeric reference 300.

Figures 3C, 3D:
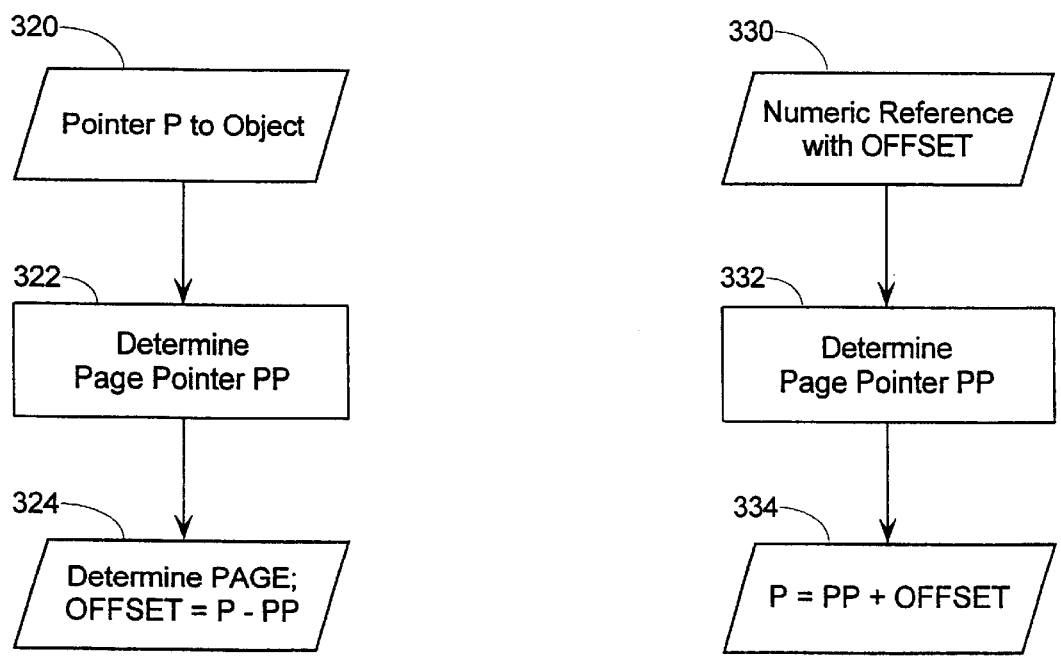
FIG. 3(c) is a flowchart for generating a page-offset numeric reference from a machine pointer.
FIG. 3(d) is a flowchart for dereferencing a page-offset numeric reference.

FIG. 3(c) illustrates steps taken to produce a page-offset numeric reference based on a machine pointer P to object 316. At step 320, the machine pointer P to object 316 is obtained, typically from a variable passed into a function, returned from a function or memory allocation operator, loaded from a memory address not part of the program state, or produced by dereferencing a numeric reference. In a working example to illustrate this calculation, a machine pointer P having a value of 0x20446740 is obtained from a pointer parameter passed into a function of the run-time environment.

At step 322, a page pointer PP containing the page address of the page is determined. If the page is guaranteed to be aligned on a boundary at least as large as the fixed-size of the page, then the page address can be determined by masking off the appropriate number of bits from the machine pointer P. In this case, if page is aligned on a 4 kB boundary, then the base pointer can be obtained by masking off the least significant 12 bits to produce, for example, a page address of 0x20446000.

On the other hand, for implementations without this page alignment guarantee, a header or pre-header for the object may be consulted by dereferencing the machine pointer P plus a fixed non-negative or negative displacement, respectively. In various implementations, the header or pre-header may contain the page address itself or an offset from the referencing object to the beginning of the page. In the working example, let us assume that a page pointer having a page address of 0x20446000 is determined.

At step 324, the page number 306 and the offset 304 portions of the page-offset numeric reference are determined. The page address is used to fetch the corresponding page number from the page header of page 312b. Preferably, this page number is already shifted by the page size to facilitate the bitwise masking operations. In the example, if the object is in 4 kB page 1 (i.e. page 312b), then the page number would be 1<<12=0x00001000. The offset 304 is calculated as a difference of the virtual address of the object 316 and the page address of the page 312b. This calculation can be performed by subtracting the page pointer PP from the object pointer P. In the working example, the calculated offset 304 is 0x20446740−0x20446000=0x00000740. Combining the shifted page number and the offset produces a page-offset numeric reference of 0x00001000|0x00000740= 0x00001740. An appropriate tag 302, if implemented, is added or logically-ored into the result.

FIG. 3(d) illustrates steps taken to produce a machine pointer P based on a page-offset numeric reference to object 316. At step 330, the page-offset numeric reference to object 316 is obtained, typically by reading from a memory address. In a working example to illustrate this calculation, a page-offset numeric reference having a value of 0x00001740 is obtained from reading a program state memory location under control of a memory management component of the run-time environment.

At step 332, the page pointer PP containing the page address of the page is determined. First, the appropriate page map 314 needs to be identified, which is found in the page header of the referencing object. If the page of the referencing object is guaranteed to be aligned on a boundary at least as large as the size of the page, then the referencing page address can be determined by masking the appropriate number of bits of the virtual address of the referencing object. In this case, if the page is aligned on a 4 kB boundary, then the referencing page address pointer can be obtained by masking off the least significant 12 bits of 0x1C209B70, for example, to produce a page address of 0x1C209000.

On the other hand, for implementations without this guarantee, a header or pre-header for the referencing object may be consulted by dereferencing the machine pointer P plus a fixed offset. In various implementations, the header or pre-header may contain the referencing page address itself or an offset from the referencing object to the beginning of the referencing page.

Accordingly, the page map 314 is reachable by a field reserved in the referencing page header. The appropriate entry in page map 314 is determined by indexing the page 306 value, shifted right by an appropriate amount, e.g. 12 for 4 kB pages. In the working example, assume that a page pointer having a page address of 0x20446000 is thus fetched from entry #1 of page map 314.

At step 334, the virtual address of the object 316 is obtained by adding the offset 304 stored in the numeric reference 300 to the page address of the page 312b, fetched from page map 314. This calculation can be performed by adding or logically oring the offset 304 to the page pointer PP. In the working example, the virtual address of the object 314 is calculated to be 0x20446000+0x00000740= 0x20446740. An appropriate machine pointer tag 302, if necessary, is added or logically-ored into the result.

Since a paged object crosses a page boundary, slot-access operations for the paged object need additional support from the run-time environment. A slot-access operation gets or sets a value of a "slot" in a object (i.e. a field or instance variable) at a known displacement from the virtual address of the beginning of the object. If the object is contiguous, then the address of the slot can be determined simply by adding the displacement to the beginning of the object. For paged objects, on the other hand, this addition results in an invalid address, because the page boundary may occur between any of the slots and vary from instance to instance.

Accordingly, a slot-access operation of a machine pointer to a paged object requires first converting the machine pointer in to a page-offset numeric reference and checking to see if adding the displacement crosses one or more page boundaries. The displacement is added to the page-offset numeric reference and adjusted to account for the size of the page headers for each of the crossed boundaries. The resultant page-offset numeric reference is then dereferenced as described supra.

It is evident that the slot-access operation for a paged object is fairly cumbersome. Therefore, it is desirable, when allocating memory for an object, to find or allocate a new page that can fit the object if possible. Preferably, only those objects that are larger than the effective page size (i.e. the fixed pages size minus the page header size) are allocated on a plurality of pages. Since distinguishing between paged objects and contiguous objects is a common operation in performing a slot-access operation, the contiguity of the referenced object is preferably stored in a machine pointer tag as a storage property to avoid dereferencing the machine pointer to fetch that storage property from the object's header.

Self-Relative Numeric References

As described supra, dereferencing a page-offset numeric reference to a object, whether the object is paged or contiguous, involves some overhead, which incurs a performance penalty that may be unacceptable for some implementation environments. More specifically, dereferencing a page-offset numeric reference requires at least one memory access to the page map, which may not be currently in cache or, worse, loaded in volatile memory. Consequently, resolving the resulting cache miss or page fault requires additional machine cycles and therefore imposes a performance hit.

Because of the performance hit, it is desirable to define and use self-relative numeric references. When a referencing object contains a self-relative numeric reference to a referenced object, the self-relative numeric reference contains an offset to the referenced object that is relative to an address of the referencing object, e.g. the starting address of the object. Dereferencing a self-relative numeric reference therefore entails adding the offset to the virtual address the start of the referencing object. Since the virtual address to the referencing object is used to fetch the self-relative numeric reference from memory in the first place, a machine pointer with this virtual address is probably sitting in a high-speed register. Even if the machine pointer is not in a register, it is on the stack and probably in the cache or in a loaded page. Therefore, the overhead for dereferencing a self-relative numeric reference is commensurate with dereferencing a machine pointer and much less than dereferencing a page-offset pointer.

Figure 4A:
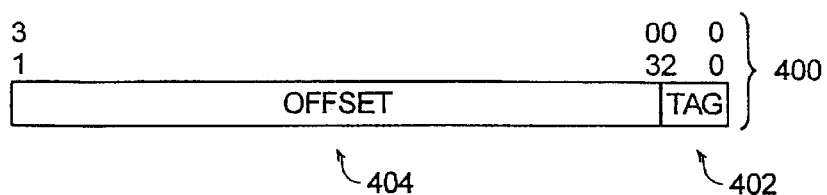
FIG. 4(a) is schematic drawing of a layout of a self-relative numeric reference.

Accordingly, a self-relative numeric reference to an object encodes the location of the object as an offset from the beginning of the referencing object. FIG. 4(a) depicts a layout of an exemplary four-byte (32-bit) self-relative numeric reference 400. In some embodiments, the self-relative numeric reference 400 includes, in addition to the offset, a small number of bits for a tag 402, that is used for discriminating among various kinds of numeric and other supported reference formats and to cache storage properties of the referenced object. The function of the tag 402 is described in more detail infra, and it is to be understood, of course, that the present invention is not limited to numeric references that include a tag 402.

The self-relative numeric reference 400 includes an offset 404, which indicates the displacement from the referencing object. If the self-relative numeric reference includes a tag 402, the offset 404 may be defined as the numeric reference with the tag 402 masked off. For example, a self-relative numeric reference having a hexadecimal value of 0x0423CBD0 specifies a displacement of 69,454,800 bytes from the referencing object. As another example, a three-bit tagged numeric reference of 0x00004321 specifies a displacement of 0x00004320 or 17,184 bytes from the referencing object.

Figure 4B:
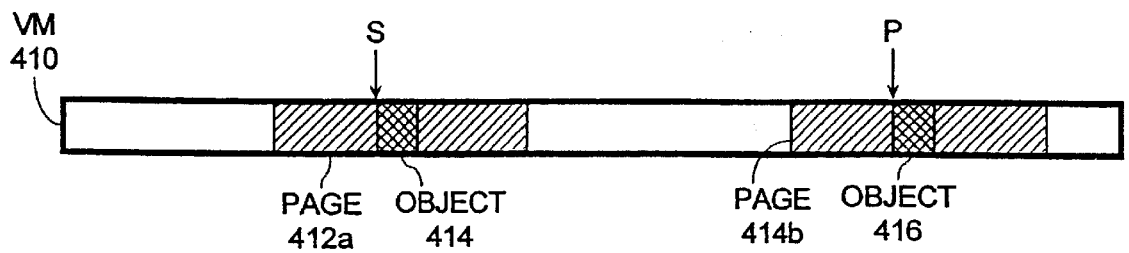
FIG. 4(b) is a schematic drawing of a portion of a virtual memory configuration in which the self-relative numeric reference is used.

Referencing and dereferencing a self-relative numeric reference is illustrated with respect to an exemplary memory configuration of portions of a virtual address space 410 as shown in FIG. 4(b). Virtual address space 410 includes an object memory comprising page 412a and 412b. Object 414 is located at an address within page 412a marked by machine pointer S, and object 216 is located at an address within page 412b marked by object machine pointer P.

For purposes of discussion, it will be assumed that, if the object machine pointer P is tagged, then the tag is masked off from the object machine pointer P as the beginning of the calculations. In those embodiments that employ tagged numeric references, then it is assumed that the appropriate tag 402 will be set in the numeric reference 400. In another embodiment, wherein machine pointers and numeric references are both tagged, a tag assignment scheme may be adopted such that the calculations for referencing and dereferencing disclosed herein also generate the appropriate tag, without having to handle the tags separately.

Figure 4C:
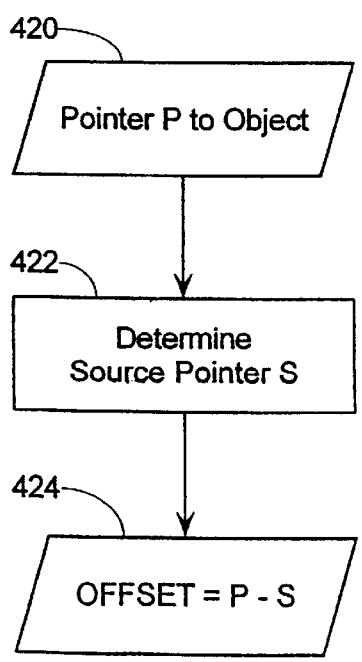
FIG. 4(c) is a flowchart for generating a self-relative numeric reference from a machine pointer.
Figure 4D:
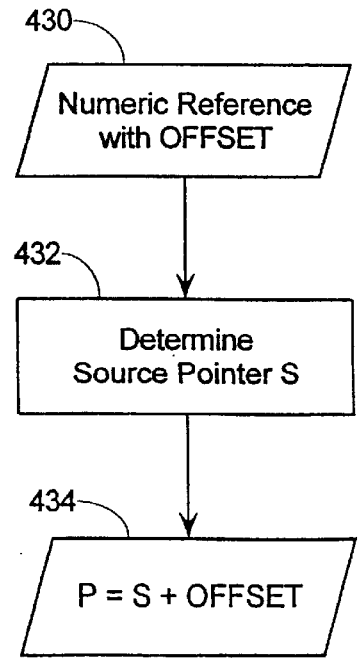
FIG. 4(d) is a flowchart for dereferencing a self-relative numeric reference.

FIG. 4(c) illustrates steps taken to produce a self-relative numeric reference based on a machine pointer P to object 416 for storage in object 414. At step 420, the machine pointer P to object 416 is obtained, typically from a variable passed into a function, returned from a function or memory allocation operator, loaded from a memory address not part of the program state, or produced by dereferencing a numeric reference. In a working example to illustrate this calculation, a machine pointer P having a value of 0x20446740 is obtained from a pointer parameter passed into a function of the run-time environment.

At step 422, a source machine pointer S containing the virtual address of the referencing object determined. Since the self-relative numeric reference is to be stored in the referencing object, this pointer is already available, typically in a high-speed memory such as a register or cache. In the working example, let us assume that a source pointer S having a base address of 0x1C209B70 is determined.

At step 424, the offset 404 that will be stored in the self-relative numeric reference 400 is calculated as a difference of the virtual address of the referenced object 616 and the virtual address of the referencing object 414. This calculation can be performed by subtracting the source pointer S from the object pointer P. In the working example, the calculated offset is 0x20446740−0x1C209B70= 0x0423CBD0, which constitutes the self-relative numeric reference. When the calculated offset is negative, software arithmetic may be employed to ensure that the negative number is in the proper format for a portable numeric reference. For example, such software arithmetic would employed in an embodiment wherein negative numeric references are required to be in two's complement representation but the underlying hardware employs a different representation for negative number, for example one's complement or sign-magnitude. Finally, an appropriate tag 402, if implemented, is added or logically-ored into the result.

FIG. 4(*d*) illustrates steps taken to produce a machine pointer P based on a self-relative numeric reference to object 416. At step 430, the self-relative numeric reference to object 416 is obtained, typically by reading from a memory address of the program state, such as from within referencing object 414. When the offset in the numeric reference is a negative number, software arithmetic may be employed to ensure that the negative number is in the proper format for the underlying hardware. In a working example to illustrate this calculation, a self-relative numeric reference having a value of 0x0423CBD0 is obtained from reading a program state memory location under control of a memory management component of the run-time environment.

At step 432, a source pointer S containing the virtual address of the referencing object, Since the self-relative numeric reference is fetched from the referencing object, the machine pointer for the referencing object 414 is already available, typically in a high-speed memory such as a register or cache. In the working example, let us assume that a source pointer S having a virtual address of 0x1C209B70 is determined.

At step 434, the virtual address of the object 416 is obtained by adding the offset 404 stored in the numeric reference 400 to the source address of the referencing object 414. This calculation can be performed by adding the offset 404 to the source pointer S. An appropriate machine pointer tag 402, if necessary, is added or logically-ored into the result. In the working example, the virtual address of the object 414 is calculated to be 0x1C209B70+0x0423CBD0= 0x20446740.

Saving and Loading Program State

Figure 5:
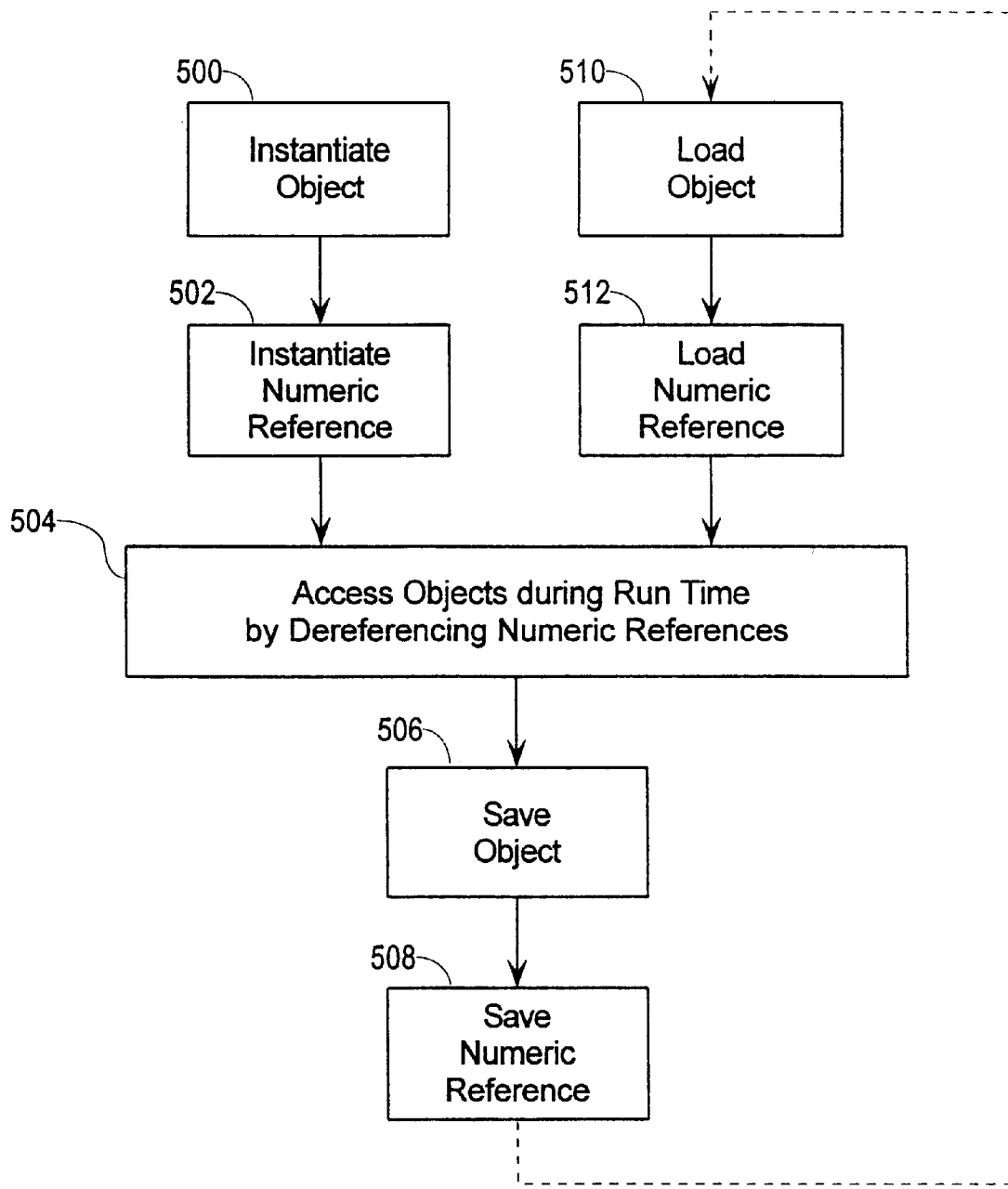
FIG. 5 is flowchart for saving and loading numeric references in a secondary storage.

FIG. 5 is a flowchart illustrating a life cycle of numeric references within a runtime environment. At step 500, the run-time environment instantiates an object, by allocating and initializing memory for the object. The run-time environment manipulates access and updates to the object through a machine pointer.

When a reference to the object is to be stored in another object, the "referencing object," the machine pointer is converted into a numeric reference (step 502). This operation involves calculating an offset (preferably measured in bytes) from the object to an implied pointer to a predefined location in an area of virtual memory associated with either the referencing object or the referenced object, depending on the kind of numeric reference employed. For example, a base-offset numeric reference specifies an offset from the beginning of an object memory; a page-offset numeric reference specifies an offset from the beginning of a page; and a self-relative numeric reference specifies an offset from the beginning of the referencing object. In other embodiments, the numeric reference may be relative to the end of the memory area, or to a location at a fixed displacement from the beginning or end of the memory area, whether interior or exterior.

At step 504, objects are accessed during run-time by dereferencing the numeric references. Dereferencing a numeric reference involving generating the implied machine pointer and adding the offset in the numeric reference. Of the three described kinds of numeric references, self-relative numeric references exhibit the best performance, because the implied pointer, the beginning of the referencing object, is almost always already available. Page-offset numeric references, on the other hand, exhibit the worst run-time performance because it is necessary to access the page map.

When the program state is to be saved to a secondary storage medium, both the objects (step 506) and the numeric references contained in the objects (step 508) are saved. Since numeric references provide an invariant, machine-independent representation, numeric references saved to secondary storage will take up the same space as in virtual memory. To the extent that any processing or software arithmetic needs to occur for saving and loading numerical references, e.g. to handle endianness or one's complement architectures, this processing will not require changes to the size of the numeric references. Therefore, objects (step 510) and numeric references (step 512) can be loaded later in the process or by another processed with little overhead, and then accessed as any other numeric reference (step 504).

Each of the three described kinds of numeric references exhibit different degrees of flexibility in saving and loading to and from secondary storage. Page-offset numeric references are the most flexible because the pages can be relocated anywhere in the virtual memory as long as the page map is updated. Base-offset numeric references, however, are limited to systems capable of allocating contiguous segments of the virtual memory that are as large as the object memory. Self-relative numeric references, although implementable on a paged memory system, require that the various pages be loaded in the same relative locations, which may not always be possible.

Accordingly, there is a trade-off between run-time performance and flexibility in secondary storage. Of the three types of numeric references described supra, self-relative numeric references exhibit the best run-time performance and page-offset numeric references exhibit the most flexible secondary storage properties. Therefore, it would be desirable to use self-relative numeric references for run-time usage and page-offset numeric references for secondary storage usage.

In accordance with one embodiment, numeric references are converted into page-offset numeric reference when saving to the secondary storage (step 508). Furthermore, run-time numeric references, where possible, are implemented as self-relative numeric references. More specifically, a numeric reference is instantiated in step 502 as a self-relative numeric reference and a page-offset numeric reference loaded from secondary storage in step 512 is converted into a self-relative numeric reference. This conversion can be eager, at load time, or lazy, at dereference time. Unlike pointer swizzling, the overhead for convert between numeric reference types is relatively low, does not violate the invariant format of objects, and be deferred until necessary.

Tagged Numeric References

In some environments, it is necessary for page-offset numeric references and self-references to co-exist during run-time. For example, a self-relative numeric reference might be limited to 32 bits and therefore cannot express a reference between objects that are displaced from each other by more than $2^{32}$ bytes (four gigabytes), which can easily happen on a 64-bit virtual memory system. Consequently, self-relative numeric references would be used with near objects and page-offset numeric references would be used with far objects. Since self-relative numeric references and page-offset numeric references are dereferenced differently and since the performance of dereferencing self-relative numeric references is critical to the overall performance of the run-time environment, it is desirable for a cheap way to distinguish between self-relative numeric references and page-offset numeric references.

According to one embodiment, numeric references are tagged to indicate whether the numeric references are self-relative numeric references or page-offset numeric references. In other words, a certain number of bits in a numeric reference, for example the higher-order bits or lower-order bits, is reserved for distinguishing the numeric reference format. The information embedded within the numeric reference, which is likely to be sitting in a fast-access machine register, can therefore be retrieved very quickly, without requiring additional memory cycles to fetch the header of the referenced object.

A preferred implementation of numeric reference tagging introduces an alignment invariant and then exploits the alignment invariant in a run-time environment to encode the numeric reference format in the lower-order bits. Specifically, objects managed by the run-time environment are stored at an N-bit aligned address, or, in other words, the storage for these objects begins at virtual addresses at $2^N$-byte boundaries. For example, if the objects can be stored at three-bit aligned addresses, that is, on $2^3=8$ byte boundaries, a legal start address for such an object might be 0x20446740, but an address such as 0x20446743 is not a valid start address for the storage of an object. Consequently, the three least significant bits of the numeric reference do not serve to differentiate different objects, since only one of the eight values for the three least significant bits is a legal address and the remaining seven values do not point to any other object. Given this alignment restriction, numeric references that resolve to addresses 0x20446740 through 0x20446747 effectively refer to the same object.

Therefore, any of the N least significant bits of a reference to an N-bit aligned object can be used as a tag to encode other information, namely the format of the numeric reference and storage properties of the reference object. For example, tag values of 0 and 4 may indicate a page-offset numeric reference, while tag values of 3 and 7 indicate a self-relative numeric reference. The remaining portion of the numeric reference contains the offset for the numeric reference and other information important for the particular format of the numeric reference, such as the page number.

Reference tagging also allows numeric references to be used in conjunction with other reference types. For example, an indexed reference is a type of reference that evaluates to an array entry of one sort of another. Some the non-tag bits of the indexed reference specify the array and others specific an index into the array. A page-offset numeric reference may be thought of a hybrid numeric reference and indexed reference, wherein the page number specifies an index into the page map and the offset portion specifies a relative location of the object within the page. As mentioned earlier, some embodiments restrict the use of numeric references for encoding references between objects in the same object memory; accordingly, indexed references provide a mechanism for supporting references between objects of different object memories.

Numeric references therefore encode references between objects an invariant format that is both efficient for run-time usage and flexible for machine-independent secondary storage. Since numeric references encode a reference as an integral offset from an implied machine pointer, numeric references can easily between converted into and from machine pointers, without requiring expensive lookups into associative data structure as in pointer swizzling. Moreover, page-offset numeric references provide a systematic approach for managing memory for large objects, allowing the large objects to be broken up into non-contiguous pages in a manner transparent to the user code.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing memory for a run-time environment, comprising the computer-implemented steps of:

maintaining a plurality of objects and references between the objects as numeric references in a virtual memory for run-time use, wherein a numeric reference includes an integer offset from a virtual memory address and the objects maintained in the virtual memory are instantiated by a first process executing on a first processor; and storing without swizzling the objects and the references in a numeric reference format in a secondary storage that is not part of the virtual memory, wherein the objects stored in the secondary storage are loadable without unswizzling by a second process executing on a second processor that is incompatible with the first processor.

2. The method of claim 1, wherein:

the objects maintained in the virtual memory are instantiated on a first virtual memory page; and the objects stored in the secondary storage are loadable into a second virtual memory page.

3. A method of managing memory for a run-time environment, comprising the steps of:

storing a plurality of objects in a virtual memory;

generating numeric references by calculating pointer differences between addresses of the objects and machine pointers at predetermined locations relative to regions of the virtual memory in which the objects are located;

storing references between the objects as the numeric references in the virtual memory, wherein a numeric reference includes an offset from a virtual memory address; and storing the objects and the references in a numeric reference format in a secondary storage that is not part of the virtual memory.

4. The method of claim 3, wherein:

the step of storing a plurality of objects in a virtual memory includes the step of storing the objects within a contiguous memory segment;

the step of storing references between the objects in a numeric reference format in the virtual memory includes the step of storing the references as base-offset numeric references.

5. The method of claim 4, wherein one of the predetermined locations indicates a beginning of the contiguous memory segment to produce the base-offset numeric references.

6. The method of claim 3, wherein:

the step of storing a plurality of objects in a virtual memory includes the step of storing the objects within a plurality of non-contiguous pages; and the step of storing references between the objects as numeric references in the virtual memory includes the step of storing the references as page-offset numeric references.

7. The method of claim 6, wherein one of the predetermined locations indicates a beginning of a page storing the objects to produce the page-offset numeric references.

8. The method of claim 3, wherein the one of the predetermined locations indicates a beginning of referencing objects.

9. The method of claim 3, wherein the step of generating the numeric references includes assigning a tag value in tag portion of a numeric reference, said tag value indicating whether the numeric reference is a self-relative reference.

10. A method of managing memory for a run-time environment, comprising the steps of:

storing a plurality of objects in a virtual memory;

storing the references between the objects as self-relative numeric references in the virtual memory, wherein a self-relative numeric reference includes an offset from a virtual memory address; and storing the references in a page-offset numeric reference format in a secondary storage that is not part of the virtual memory.

11. A method of managing memory by a first process executing on a first processor in a run-time environment, comprising the computer-implemented steps of:

loading a plurality of objects into a virtual memory from a secondary storage that is not part of the virtual memory, wherein the objects stored in the secondary storage are loadable without unswizzling by a second process executing on a second processor that is incompatible with the first processor;

loading without unswizzling references between the objects as numeric references from the secondary storage into the virtual memory for run-time use; and dereferencing one of the numeric references by adding, to a virtual memory address, an integer offset contained within the one of the numeric references.

12. A method of managing memory by a first process executing on a first processor in a run-time environment, comprising the steps of:

loading a plurality of objects into a contiguous memory segment of a virtual memory from a secondary storage that is not part of the virtual memory, wherein the objects stored in the secondary storage are loadable without unswizzling by a second process executing on a second processor that is incompatible with the first processor;

loading references between the objects as numeric references from the secondary storage into the virtual memory; and dereferencing one of the numeric references by adding an integer offset contained within the one of the numeric references to a machine pointer holding an address of a beginning of the contiguous memory segment.

13. A method of managing memory in a run-time environment, comprising the steps of:

loading a plurality of objects into a plurality of non-contiguous pages;

updating a page map containing a plurality of page pointers holding addresses of a beginning of corresponding said pages;

loading references between the objects as numeric references from the secondary storage into the virtual memory; and dereferencing one of the numeric references by:
   fetching a page pointer from the page map based on a page number contained within the one of the numeric references, and
   adding an offset contained within the one of the numeric references to the page pointer.

14. A method of managing memory in a run-time environment, comprising the steps of:

loading a plurality of objects into a virtual memory from a secondary storage that is not part of the virtual memory;

loading references between the objects as numeric references from the secondary storage into the virtual memory; converting base-offset numeric references into self-relative numeric references; and dereferencing one of the numeric references by adding an offset contained within the one of the numeric references to a machine pointer holding an address of a beginning of an object containing the one of the numeric references.

15. A method of managing memory in a run-time environment, comprising the steps of:

loading a plurality of objects into a virtual memory from a secondary storage that is not part of the virtual memory;

loading the references between the objects as page-offset numeric references from a secondary storage;

converting the page-offset numeric references into self-relative numeric references;

storing the self-relative references in the virtual memory; and dereferencing one of the numeric references by adding, to a machine pointer, an offset contained within the one of the numeric references.

16. A computer-readable medium bearing instructions for managing memory for a run-time environment, said instructions arranged, when executed, for causing one or more processors to perform the steps of:

maintaining a plurality of objects and references between the objects as numeric references in a virtual memory for run-time use, wherein a numeric reference includes an integer offset from a virtual memory address and the objects maintained in the virtual memory are instantiated by a first process executing on a first processor; and storing without swizzling the objects and the references in a numeric reference format in a secondary storage that is not part of the virtual memory, wherein the objects stored in the secondary storage are loadable without unswizzling by a second process executing on a second processor that is incompatible with the first processor.

17. The computer-readable medium of claim 16, wherein:
the objects maintained in the virtual memory are instantiated on a first virtual memory page; and
the objects stored in the secondary storage are loadable into a second virtual memory page.

18. A computer-readable medium bearing instructions for managing memory for a run-time environment, said instructions arranged, when executed, to cause one or more processors to perform the steps of:

storing a plurality of objects in a virtual memory;

generating numeric references by calculating pointer differences between addresses of the objects and machine pointers at predetermined locations relative to regions of the virtual memory in which the objects are located storing references between the objects as the numeric references in the virtual memory, wherein a numeric reference includes an offset from a virtual memory address; and storing the objects and the references in a numeric reference format in a secondary storage that is not part of the virtual memory.

19. The computer-readable medium of claim 18, wherein:
the step of storing a plurality of objects in a virtual memory includes the step of storing the objects within a contiguous memory segment;
the step of storing references between the objects in a numeric reference format in the virtual memory includes the step of storing the references as base-offset numeric references.

20. The computer-readable medium of claim 19, wherein one of the predetermined locations indicates a beginning of the contiguous memory segment to produce the base-offset numeric references.

21. The computer-readable medium of claim 18, wherein:
the step of storing a plurality of objects in a virtual memory includes the step of storing the objects within a plurality of non-contiguous pages; and
the step of storing references between the objects as numeric references in the virtual memory includes the step of storing the references as page-offset numeric references.

22. The computer-readable medium of claim 21, wherein one of the predetermined locations indicates a beginning of a page storing the objects to produce the page-offset numeric references.

23. The computer-readable medium of claim 18, wherein one of the predetermined locations indicates a beginning of referencing objects.

24. The computer-readable medium of claim 18, wherein the step of generating the numeric references includes assigning a tag value in tag portion of a numeric reference, said tag value indicating whether the numeric reference is a self-relative reference.

25. A computer-readable medium bearing instructions for managing memory for a run-time environment, said instructions arranged to cause one or more processors to perform the steps of:

storing a plurality of objects in a virtual memory;

storing the references between the objects as self-relative numeric references in the virtual memory, wherein a self-relative numeric reference includes an offset from a virtual memory address; and storing the references in a page-offset numeric reference format in a secondary storage that is not part of the virtual memory.

26. A computer-readable medium bearing instructions for managing memory by a first process executing on a first processor in a run-time environment, said instructions arranged, when executed, to cause one or more processors to perform the steps of:

loading a plurality of objects into a virtual memory from a secondary storage that is not part of the virtual memory, wherein the objects stored in the secondary storage are loadable without unswizzling by a second process executing on a second processor that is incompatible with the first processor;

loading without unswizzling references between the objects as numeric references from the secondary storage into the virtual memory for run-time use; and dereferencing one of the numeric references by adding, to a virtual memory address, an integer offset contained within the one of the numeric references.

27. A computer-readable medium bearing instructions for managing memory by a first process executing on a first processor for a run-time environment, said instructions arranged to cause one or more processors to perform the steps of:

loading a plurality of objects into a contiguous memory segment of a virtual memory from a secondary storage that is not part of the virtual memory, wherein the objects stored in the secondary storage are loadable without unswizzling by a second process executing on a second processor that is incompatible with the first processor;

loading references between the objects as numeric references from the secondary storage into the virtual memory; and dereferencing one of the numeric references by adding an integer offset contained within the one of the numeric references to a machine pointer holding an address of a beginning of the contiguous memory segment.

28. A computer-readable medium bearing instructions for managing memory for a run-time environment, said instructions arranged to cause one or more processors to perform the steps of:

loading a plurality of objects into a plurality of non-contiguous pages;

updating a page map containing a plurality of page pointers holding addresses of a beginning of corresponding said pages;

loading references between the objects as numeric references from the secondary storage into the virtual memory; and dereferencing one of the numeric references by:
fetching a page pointer from the page map based on a page number contained within the one of the numeric references, and
adding an offset contained within the one of the numeric references to the page pointer.

29. A computer-readable medium bearing instructions for managing memory for a run-time environment, said instructions arranged to cause one or more processors to perform the steps of:
loading a plurality of objects into a virtual memory from a secondary storage that is not part of the virtual memory;
loading references between the objects as numeric references from the secondary storage into the virtual memory;
converting base-offset numeric references into self-relative numeric references; and
dereferencing one of the numeric references by adding an offset contained within the one of the numeric references to a machine pointer holding an address of a beginning of an object containing the one of the numeric references.

30. A computer-readable medium bearing instructions for managing memory for a run-time environment, said instructions arranged to cause one or more processors to perform the steps of:
loading a plurality of objects into a virtual memory from a secondary storage that is not part of the virtual memory;
loading the references between the objects as page-offset numeric references from a secondary storage;
converting the page-offset numeric references into self-relative numeric references;
storing the self-relative references in the virtual memory; and
dereferencing one of the numeric references by adding, to a machine pointer, an offset contained within the one of the numeric references.

* * * * *